United States Patent

Stroebel et al.

[15] 3,670,963

[45] June 20, 1972

[54] LIQUID FERTILIZER APPLYING APPARATUS

[72] Inventors: Maurice G. Stroebel; Terryl T. Stroebel; Merle J. Stroebel, all of Danvers, Minn. 56231

[22] Filed: Sept. 4, 1970

[21] Appl. No.: 69,576

[52] U.S. Cl. ....................239/77, 239/168

[51] Int. Cl. ....................A01n 17/08

[58] Field of Search ....................239/168, 77, 78

[56] References Cited

UNITED STATES PATENTS

| | | | |
|---|---|---|---|
| 2,677,576 | 5/1954 | Brann, Jr. | 239/77 |
| 2,667,717 | 2/1954 | Daugherty | 239/77 |
| 3,504,857 | 4/1970 | Ballu | 239/168 |
| 2,925,222 | 2/1960 | Spreng | 239/77 X |
| 3,490,695 | 1/1970 | Rittenhouse | 239/77 |

FOREIGN PATENTS OR APPLICATIONS

| | | | |
|---|---|---|---|
| 581,135 | 8/1958 | Italy | 239/77 |
| 728,276 | 4/1955 | Great Britain | 239/77 |

*Primary Examiner*—M. Henson Wood, Jr.
*Assistant Examiner*—John J. Love
*Attorney*—Williamson, Palmatier & Bains

[57] ABSTRACT

A mobile apparatus for applying liquid fertilizer, herbicide, pesticides and the like to crops comprises a mobile chassis having a chambered fertilizer (or weed killer) containing tank and a mist producing device mounted thereon. The mist producing device includes a fan housing having rearwardly facing outlets around which are arranged nozzle mechanisms through which the liquid fertilizer is discharged. The fine jets of liquid fertilizer or weed killer are broken up into a mist or atomized condition by the high velocity streams of air and the mist is applied to the crops as the apparatus is moved through the crops to be fertilized or treaded. A foldable sectional boom is also mounted on the chassis and is selectively usable with respect to the mist producing device to thereby permit foliage feeding of the crops or the application of a weed killer to the crops in a controlled manner. The chambered tank permits fertilizer and weed killer to be applied simultaneously but obviates the need for mixing.

3 Claims, 5 Drawing Figures

INVENTORS
MAURICE G. STROEBEL,
TERRYL T. STROEBEL,
BY MERLE J. STROEBEL
Williamson, Palmatier & Bains
ATTORNEYS INVENTORS
MAURICE G. STROEBEL,
TERRYL T. STROEBEL,
BY MERLE J. STROEBEL
Williamson, Palmatier
& Bains
ATTORNEYS INVENTORS
MAURICE G. STROEBEL,
TERRYL T. STROEBEL,
MERLE J. STROEBEL
BY Williamson, Palmatier & Bains
ATTORNEYS

LIQUID FERTILIZER APPLYING APPARATUS

SUMMARY OF THE INVENTION

It has been found that during certain periods of growth plants can assimilate liquid fertilizers more quickly and effectively through their leaves than a root fed fertilizer system provided that the liquid fertilizer is in the proper condition to be assimilated. In this regard, effective leaf feeding of plants requires a liquid fertilizer to be applied in a fog or mist condition. Similarly certain weeds will readily assimilate weed killers more readily when the liquid weed killer is in a fine mist condition.

It is therefore an object of this invention to provide a mobile fertilizer applying apparatus, of simple and inexpensive construction, which is effective in applying liquid fertilizer to plants or weed killer to crops as an extremely fine mist or fog. This is accomplished by producing a stream of air by a blower mechanism and discharging the jets of liquid fertilizer, weed killer or pesticide from nozzle mechanisms into the streams of air so that the liquid is broken up into a fine mist. The mist producing device is mounted on a chassis and a sectional boom is also provided to permit controlled application of fertilizer, weed killer, or pesticide especially when the apparatus is adjacent one side of the field.

DETAILED DESCRIPTION OF THE INVENTION

Figure 1:
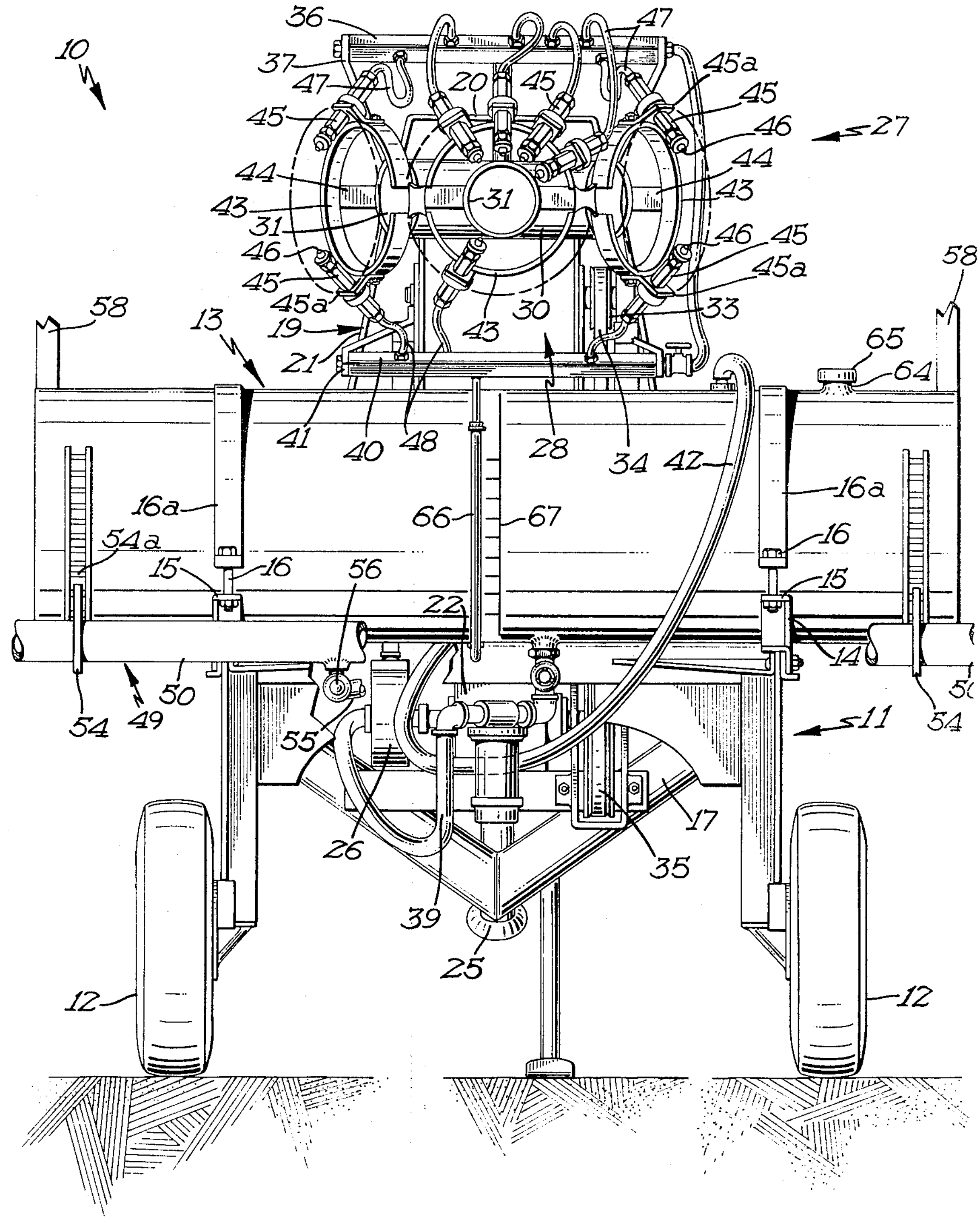
FIG. 1 is a rear elevational view of the fertilizer applying apparatus with the sectional boom device having been omitted.

Referring now to the drawings it will be seen that one embodiment of the novel fertilizer applying apparatus, designated generally by the reference numeral 10, is there shown. This apparatus 10 includes a chassis 11 having ground engaging wheels 12 to permit the apparatus to readily travel over the surface of the ground. The chassis 11 has an elongate generally cylindrical tank 13 mounted thereon and it will be noted that the tank is arranged transversely of the direction of travel and is oriented horizontally with respect to the surface of the ground. The chassis 11 is provided with front and rear pairs of brackets 14, although only the rear brackets 14 are shown in FIG. 1. These brackets are located on opposite sides of the chassis and each includes a bracket plate 15 having an opening therethrough through which projects a bolt of a bolt and nut assembly which in turn is secured to one end of an elongate generally flat strap **16*a*. It is pointed out that nut and bolt assemblies are secured to opposite ends of each strap 16*a* and two such straps are provided, each cooperating with one front and rear brackets 14 to releasably secure the tank 13** in mounted relation on the chassis.

The chassis also includes a pair of elongate forwardly converging frame members 17 having a hitch 18 mounted at the front end thereof. The hitch may be secured to a conventional hitch of a prime mover such as a tractor or the like. In this regard, it will be noted that the fertilizer applying apparatus illustrated herein is a towed type for traversal across the surface of the ground. Although not shown in the drawings, the apparatus may be provided with a supporting frame without ground engaging wheels so that it may be connected to a conventional three point tractor hitch to be raised and lowered between operative and inoperative positions as desired.

The chassis is provided with a generally inverted trough shaped shield 19 which includes a substantially flat top and which is integral with spaced apart side shield elements or plates 21. A gear box 22 is mounted on the chassis rearwardly of the shield and the input shaft 23 of the gear box is connected by a universal coupling 24 to the power takeoff shaft 25. The forward end of the power takeoff shaft 25 is adapted to be connected in driven relation to the power takeoff of the tractor. A pump 26 is also mounted on the chassis adjacent the gear box and the input shaft of the pump is connected to one of the output shafts of the gear box. The pump 26 is a rotary type pump and will be driven from the power takeoff of the tractor through the gear box 22.

A mist producing device 27 is provided and includes a squirrel cage type fan housing 28 which is mounted above and generally forwardly of the tank 13 by suitable mounting plates **28*a*. The plates 28*a* are secured at the respective lower ends to the chassis. This fan housing 28 has an inlet 29 in one side thereof and is also provided with a plurality of generally rearwardly extending cylindrical outlet heads 30. In the embodiment shown, three such outlet heads are provided, each having a circular outlet opening 31. A bladed fan 32 is mounted in the fan housing adjacent the inlet 29 and when energized serves to produce high velocity streams of air that are discharged through the outlet heads. The input shaft of the fan is connected to a pulley 33 about which is trained an endless belt 34. The belt is also trained about a pulley 35 on another output shaft of the gear box 22. Thus it will be seen that the fan or blower 32** is driven from the power takeoff of the tractor.

The mist producing device also includes a top manifold 36 which is positioned above and extends transversely of the fan housing 28 and is attached thereto by suitable mounting brackets 37. This top manifold line 36 is connected by a suitable flexible conduit 38 to the outlet of the pump 26. A control valve **38*a* is interposed in flow controlling relation in the conduit 38. A conduit 39 intercommunicates the tank 13 with the pump 26. A lower manifold line 40 is also provided and is mounted in close proximal relation to and above the tank 13 by suitable mounting brackets 41. It will be noted that the manifold also extends in the same direction as the upper manifold 36 and is connected by a conduit 42 to the upper manifold 36**.

Figure 3:
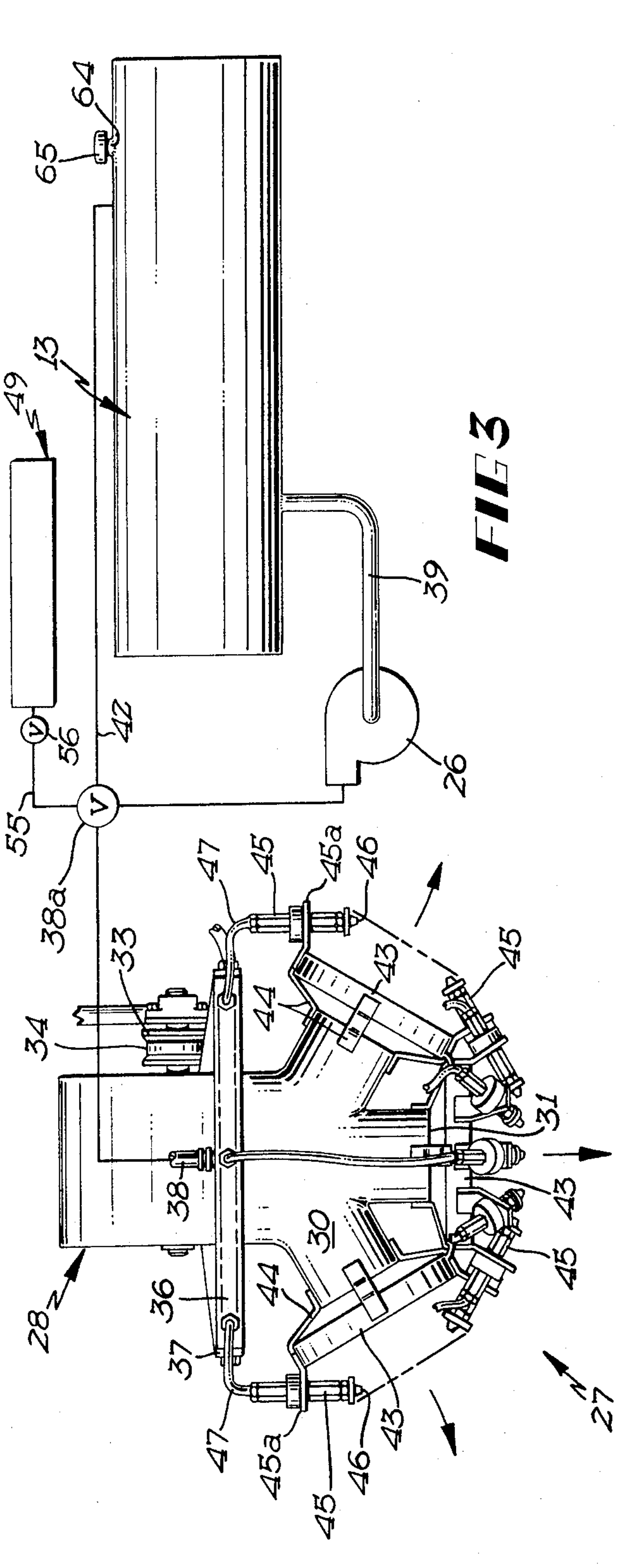
FIG. 3 is a top plan diagrammatic view of the mist producing device of the apparatus.
Figure 2:
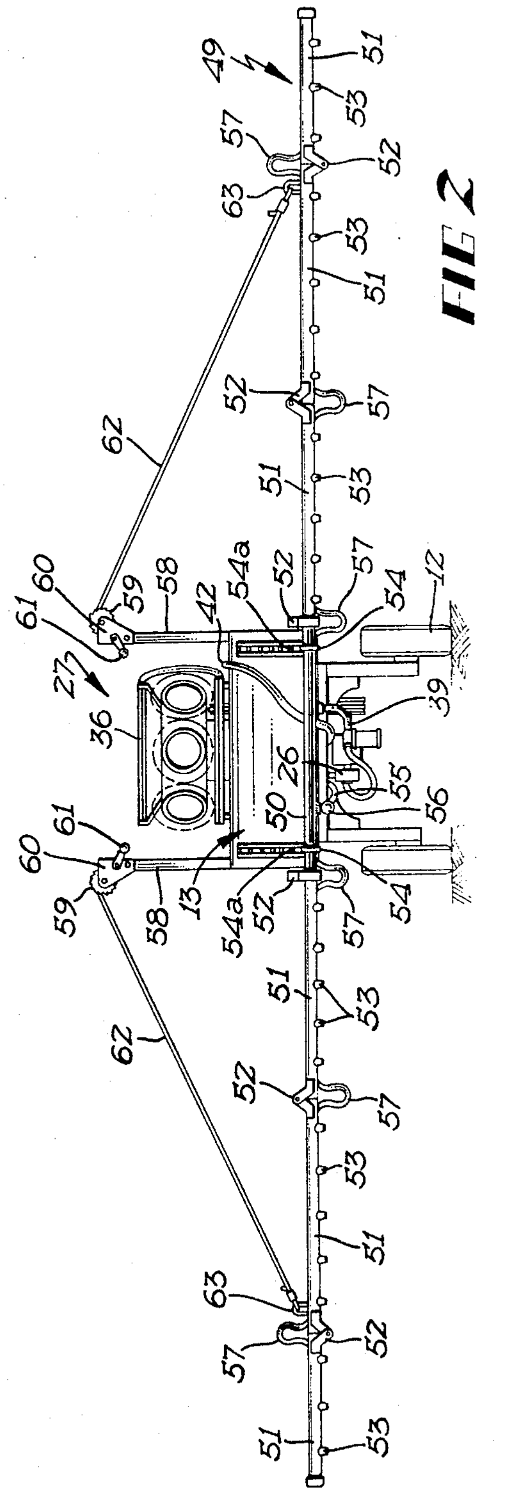
FIG. 2 is a side elevational view of the apparatus with certain parts thereof broken away for clarity.

A plurality of annular nozzle mounting rings 43 are provided, each being mounted by a plurality of brackets 44 to one of the outlet heads 30 of the fan housing 28. It will be noted that the mounting rings 43 are positioned closely adjacent but spaced slightly axially from the associated outlet head 30, as best seen in FIG. 3.

These mounting rings 30 are diametrically larger in size than the associated outlet head and each serves to mount a plurality of nozzle mechanisms 45 thereon. It will be noted that nozzle mechanisms 45 are mounted on their associated mounting ring 43 by suitable brackets **45*a*** and each nozzle mechanism is provided with a discharge orifice through which the fine high pressure jet of liquid fertilizer is discharged. In this regard, the fine jet stream of fertilizer from each nozzle mechanism is discharged angularly or rearwardly but radially inwardly into the high velocity stream of air discharged through the associated outlet head. With this arrangement, the liquid fertilizer is broken up into a fine mist or fog by a high velocity stream of air.

It will be noted that the nozzle mechanisms are arranged throughout the circumference of the associated mounting ring and in the embodiment shown, 12 such nozzle mechanisms are provided for each mounting ring so that the angular spacing between each nozzle mechanism approximates 30°. It will be noted that certain of the nozzle mechanisms are connected by conduits 47 to the upper manifold 36, while other of the conduit mechanisms are connected by conduits 48 to the lower manifold 40.

Figures 4, 5:
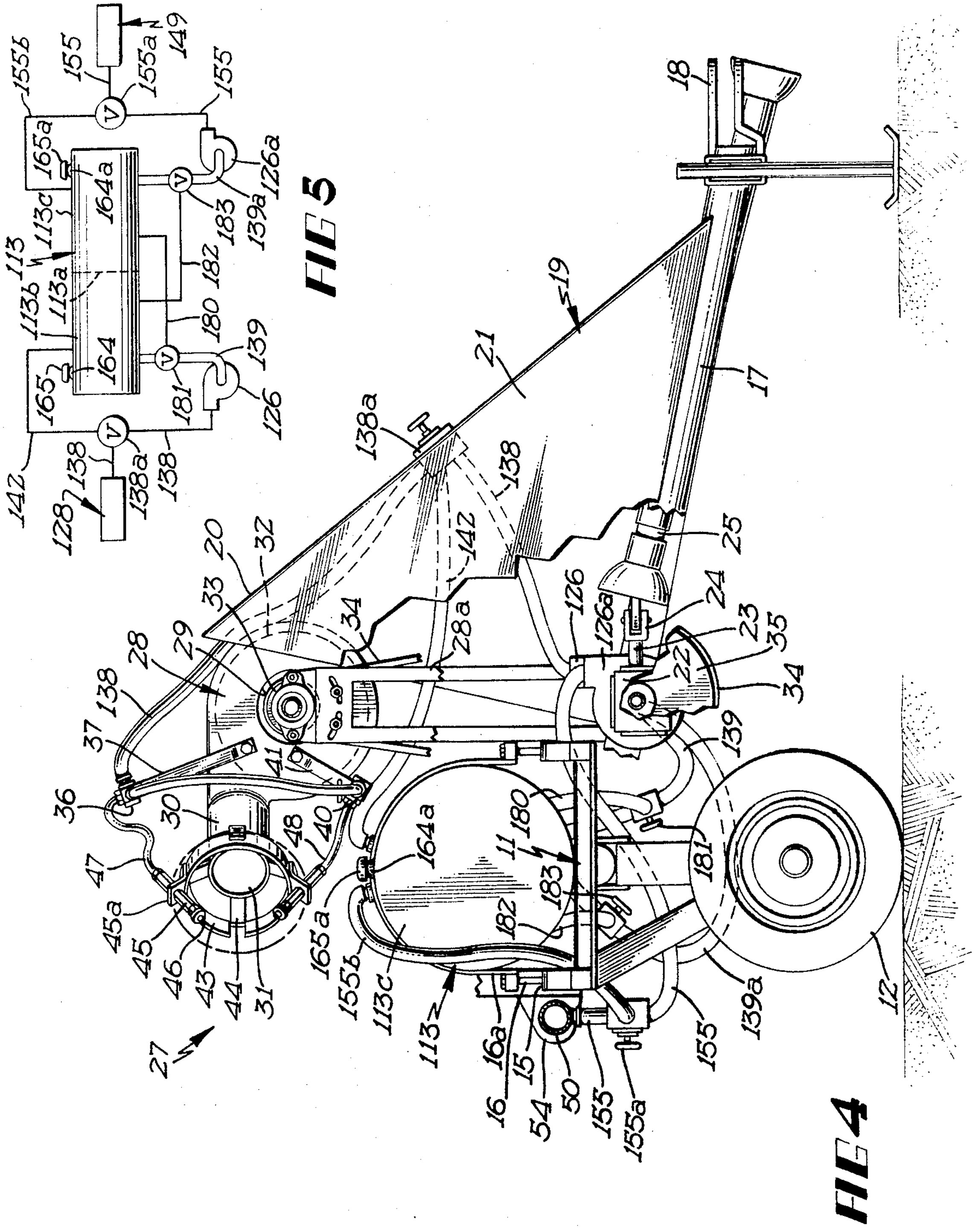
FIG. 4 is a rear elevational view of the apparatus with the sectional boom attachment in an extended operative position and with the nozzle mechanisms of the mist producing device having been omitted.
FIG. 5 is a diagrammatic view illustrating a modified form of the apparatus.

Referring now to FIG. 4 it will be seen that the fertilizer applying apparatus 10 also includes a sectional boom device 49 which is selectively usable with respect to the mist producing mechanism to permit foliage feeding of crops in a more controlled manner. The sectional boom device 49 includes a center section 50 which is hingedly connected at opposite ends thereof to a plurality of foldable outboard sections 51. Suitable hinge means 52 interconnect each adjacent outboard section to each other and also connects the innermost outboard section to the center section 50. Each of the outboard sections is provided with a plurality of longitudinally spaced apart nozzles or discharged openings 53 therein which serve to discharge liquid fertilizer in a generally downwardly and rearwardly direction. Suitable mounting brackets 54 are secured to the chassis 11 and permit the center section 50 of the boom device to be selectively mounted in a plurality of positions by the pins 54*a*. Thus the boom device may be vertically adjusted.

A conduit 55 is connected in communicating relation with the center section 54 and is also interconnected with the control valve 38 so that liquid fertilizer or weed killer under pressure may be supplied to the sectional boom device. A valve 56 is interposed in flow controlling relation with respect to the conduit 55 which may be selectively opened and closed to allow the sectional boom device to be selectively used with respect to the mist producing device.

Short flexible conduits 57 interconnect adjacent sections to each other in communicating relation. Means are also provided for selectively collapsing and extending the sectional boom device and this includes a pair of posts or supports 58 which are affixed to the chassis 11 and extend upwardly from opposite sides thereof. Each post has a reel frame 60 mounted at the upper end thereof and a ratchet reel 59 is journalled on each reel frame 60 for revolving movement relative thereto. Each ratchet reel is provided with a crank 61 and one end of an elongate cable 62 is attached to each ratchet reel and each cable is also attached to the outermost outboard section at one side of the sectional boom device by an attachment eye 63. Thus it will be seen that the sectional boom device 49 may be readily moved between the extended operative position as illustrated in FIG. 4 to a collapsed elevated inoperative position. When the boom section is in the inoperative position, the adjacent hinges fold or break in opposite directions to permit the various outboard sections to be arranged in upstanding side-by-side relation. In this regard, it is pointed out that the sectional boom device will be elevated to the inoperative position when the mist producing device is being used and alternatively, the mist device will be rendered inoperative when the sectional boom device is being used.

The tank 13 is provided with a suitable filler opening or inlet 64 provided with a closure 65 to permit ready filling of the tank. A level indicating transparent tube 65 is also provided and has one end thereof connected in communicating relation with the lower end portion of the tank 13 as best seen in FIG. 1 and has its other end suspended from the lower manifold 40. A calibrated scale 66 is applied to the exterior surface of the tank 13 adjacent the level indicator tube 65 so that the level of liquid fertilizer within the tank 13 may be readily determined.

In use, the fertilizer applying apparatus may be used not only for a leaf feeding, but also for applying herbicides and/or pesticides. The valve 38*a* will be adjusted to supply liquid fertilizer or weed killer to the upper and lower manifolds through conduit 38. The pump will be driven by the power takeoff and the fan will also be driven. As the apparatus moves along a predetermined path of travel, the liquid fertilizer will be discharged through the orifices of the nozzle mechanisms in a fine stream at a relatively high pressure and directly into the high velocity stream of air produced by the associated outlet head. These fine jets of liquid fertilizer will be immediately broken up into extremely fine particle size so that a fine mist or fog is produced. This fine mist or fog will be discharged upon the crops being fertilized and the liquid fertilizer in this fine condition may be readily utilized and assimilated by the leaves of the plants. Similarly herbicides or pesticides will be applied in the same manner. It has been found that leaf feeding during certain growth stages of the plant permits more effective and quicker assimilation of the nutrient material than root feeding but the fertilizer must be applied in a condition that can be utilized. This condition is an extremely fine particle size of the fertilizer and the mist producing device produces the optimum condition. Weeds also quickly assimilate herbicides that are applied as an air-entrained mist.

When the apparatus approaches the marginal portions of the field being treated, it is desirable to control the application of the liquid fertilizer or weed killer. The valve 38 will be adjusted to close the supply of liquid to the upper and lower manifolds. This adjustment of the valve will intercommunicate the tank with the boom. The boom section will be extended to the lowered operative position and the drive to the fan may be disengaged. The liquid fertilizer under pressure will be discharged over a plurality of rows of plants as a fine mist as the apparatus moves in a predetermined path of travel. The use of the boom permits a more controlled discharge of the liquid which is especially desirable adjacent the marginal portions of a field. Thus if a herbicide or fertilizer is being used which is detrimental to a crop in the adjacent field, then by using the boom section at the marginal portions of the field being treated, there is little likelihood of damage to the adjacent crop.

Referring now to FIG. 5, it will be seen that a slightly different embodiment of the invention is there shown, specifically the manner in which liquid can be selectively applied to the mist producing device and the sectional boom. The tank 113 is a compartmented tank and is provided with a partition 113*a* to divide the tank into compartment 113*b* and compartment 113*c*. A conduit 139 intercommunicates the tank compartment 113*b* with a pump 126 while a conduit 139*a* intercommunicates the tank compartment 113*c* to a pump 126*a*. The pump 126 is connected in communicating relation with the mist producing device 128 by means of a conduit 138. A control valve 238*a* is interposed in flow-controlling relation with respect to the conduit 138 and the valve is also connected by means of a return conduit 142 to the chamber 113*b* of the tank 113. With this arrangement, fluid may be selectively supplied to the mist producing device 128 or the valve may be adjusted so that the fluid or liquid is returned to the compartment 113*b*. Conduit 138 and conduit 139 constitute a supply conduit with respect to the mist producing device 128.

A conduit 155 interconnects the pump 126*a* with the boom section 149. A control valve 155*a* is interposed in controlling relation with respect to the conduit 155 and is also connected to one end of a return conduit 155*b*. Conduit 139*a* and conduit 155 also constitute a supply conduit for the section boom 149. The conduit 155*b* is also connected in communicating relation to the chamber 113*c* of the tank 113. Thus by adjusting the valve 155*a*, liquid may be selectively supplied to a sectional boom 149 or may be circulated from the tank chamber 113*c* through the pump 126*a* and returned to the tank chamber 113*c*.

The tank compartment 113*b* is provided with an inlet opening 164 which is closed by a suitable closure 165. Similarly, the tank chamber 113*c* is provided with an inlet opening 164*a* which is closed by a closure 165*a*.

A conduit 180 has one end thereof interconnected in communicating relation with the conduit 139, and has its other end connected in communicating relation with the tank compartment 113*c*. A control valve 181 is disposed in flow controlling relation with respect to the conduit 180 to permit selective intercommunication of the compartment 113*c* with the pump 126. Similarly, a conduit 182 has one end thereof interconnected with communicating relation with the compartment 113*b* and has the other end thereof connected in communicating relation with the conduit 139*a*. A control valve 183 is interposed in flow controlling relation with respect to the conduit 182 so that the pump 126*a* may be selectively intercommunicated with the compartment 113*b*.

With this arrangement, a liquid fertilizer may be simultaneously applied with a liquid weed killer or pesticide without requiring mixing of these liquids. For example, a liquid fertilizer may be contained in the tank compartment 113b while the compartment 113*c* may contain a herbicide or pesticide. The valve 138 may be adjusted to supply liquid fertilizer to the mist producing device 128 while the valve 155*a* may be adjusted to permit a herbicide to be supplied to the sectional boom 149. When the apparatus approaches the marginal portions of a field, the valve 138 may be adjusted to close the supply of liquid fertilizer to the mist producing device 128. After the herbicide has been applied to the marginal portion of the field through the sectional boom, the valve 183 which will have been in a closed condition will be adjusted to intercommunicate the compartment 113*b* with the pump 126*a*. Thus a final pass for applying the liquid fertilizer to the marginal portion of the field may be made. The valves 181 and 183 also permit selective intercommunication of either tank compartment with either pump so that either liquid fertilizer may be contained in both chambers or liquid herbicide may be contained in both compartments. It is also pointed out that the pump 126 is connected to the same shaft as the pump 126*a*.

From the foregoing description, it will be seen that I have not only provided a novel apparatus for applying liquid fertilizer, herbicide, pesticide or the like in a highly effective manner, but also permits the liquid fertilizer, herbicide, pesticide or the like to be applied in an extremely controlled manner. Use of the mist producing device permits liquid fertilizer weed killer or the like to be applied in an optimum manner. It has been found that liquid fertilizer is effectively assimilated when produced in a fine mist like spray and can be applied over an extremely large area, thus reducing the quantity of fertilizer needed as compared to the conventional applicator devices. It has also been found that weeds also assimilate weed killer more rapidly when the liquid is in a finely atomized or mist like condition. The use of the sectional boom permits controlled application of the mist which is highly desirable adjacent marginal portions of the field. When in the central portions of the field, it is highly desirable to allow the mist to be entrained in the air, much in the manner of crop dusting or the like with aircraft. The use of a sectional tank in one embodiment increases the versatility of the apparatus and allows both fertilizer and weed killer to be simultaneously applied without requiring mixing.

Thus it will be seen that I have provided a novel fertilizer applying apparatus, which is not only of simple and inexpensive construction, but one which functions in a more efficient manner than any heretofore known comparable device.

What is claimed is:

1. A mobile apparatus for applying liquid herbicide and for applying liquid fertilizer in an extremely fine mist, comprising a chassis having ground engaging wheels and having a hitch at the front end thereof, a compartmented tank mounted on said chassis and including a pair of compartments, one of which is adapted to contain liquid fertilizer therein, and the other compartment adapted to contain liquid herbicide, a mist producing device including a fan housing having an inlet and having a plurality of generally rearwardly facing cylindrical outlets, a driven fan mechanism in said housing and producing high velocity streams of air through said outlets, a plurality of groups of nozzle mechanisms arranged circumferentially around the periphery of each outlet and positioned in close proximal relation thereto, first supply and return conduits connected with said tank, first control valve means connecting said nozzle mechanisms in communicating relation with said first supply and return conduits, first pump means interposed in communicating relation with said first supply conduit to cause the liquid fertilizer to selectively flow under pressure from said tank to the nozzle mechanisms, or to be returned to the tank, the discharge orifice of each nozzle mechanism being angularly disposed with respect to the associated fan housing outlet to discharge a small jet of liquid at relatively high velocity angularly and rearwardly into the high velocity stream of air discharged by the associated housing outlet whereby said liquid fertilizer is atomized into an extremely fine mist, a foldable sectional boom mounted on said chassis adjacent the rear thereof and being foldable between an extended operative position and a folded inoperative position, said boom including a plurality of similar sections including a center section hingedly connected to outboard sections, second supply and return conduit means connecting said boom to said tank, a second control valve connecting said boom with said second supply and return conduits, to permit liquid herbicide to be supplied thereto, or to be returned to the tank, a second pump connected in communicating relation with said second supply conduit, each boom section having a plurality of outlets therein through which the herbicide or insecticide is discharged, whereby liquid fertilizer and herbicide may be selectively individually applied to the crops to be treated or the liquid fertilizer and herbicide may be simultaneously applied to the crops.

2. The apparatus as defined in claim 1 and a plurality of annular mounting members positioned above said tank, each mounting member being positioned adjacent but spaced radially outwardly and axially rearwardly of one of said fan housing outlets and each mounting a group of said nozzle members adjacent but axially rearwardly of one of said fan housing outlets.

3. The apparatus as defined in claim 1 and a pair of manifold lines each being positioned adjacent said groups of nozzle mechanisms and each manifold line being connected to a plurality of nozzle mechanisms of each group.

* * * * *